United States Patent
Jiang et al.

(10) Patent No.: US 11,338,819 B2
(45) Date of Patent: May 24, 2022

(54) CLOUD-BASED VEHICLE CALIBRATION SYSTEM FOR AUTONOMOUS DRIVING

(71) Applicants: Baidu USA LLC, Sunnyvale, CA (US); Baidu.com Times Technology (Beijing) Co., Ltd., Beijing (CN)

(72) Inventors: Shu Jiang, Sunnyvale, CA (US); Qi Luo, Sunnyvale, CA (US); Jinghao Miao, Sunnyvale, CA (US); Jiangtao Hu, Sunnyvale, CA (US); Xiangquan Xiao, Sunnyvale, CA (US); Jiaxuan Xu, Sunnyvale, CA (US); Yu Wang, Sunnyvale, CA (US); Jinyun Zhou, Sunnyvale, CA (US); Runxin He, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 297 days.

(21) Appl. No.: 16/588,586

(22) Filed: Sep. 30, 2019

(65) Prior Publication Data
US 2021/0094561 A1   Apr. 1, 2021

(51) Int. Cl.
| B60W 50/04 | (2006.01) |
| G06N 20/00 | (2019.01) |
| B60W 10/04 | (2006.01) |
| B60W 10/18 | (2012.01) |
| B60W 10/20 | (2006.01) |
| B60W 30/18 | (2012.01) |
| G05D 1/00 | (2006.01) |
| G06N 5/04 | (2006.01) |
| B60W 50/00 | (2006.01) |

(52) U.S. Cl.
CPC .......... *B60W 50/045* (2013.01); *B60W 10/04* (2013.01); *B60W 10/18* (2013.01); *B60W 10/20* (2013.01); *B60W 30/18* (2013.01); *G05D 1/0088* (2013.01); *G06N 5/04* (2013.01); *G06N 20/00* (2019.01); *B60W 2050/0028* (2013.01); *B60W 2050/0088* (2013.01); *B60W 2050/046* (2013.01); *B60W 2556/45* (2020.02); *B60W 2710/0605* (2013.01); *B60W 2710/18* (2013.01); *B60W 2710/20* (2013.01)

(58) Field of Classification Search
CPC ................................................. B60W 50/045
See application file for complete search history.

(56) References Cited

U.S. PATENT DOCUMENTS

| 9,916,703 | B2* | 3/2018 | Levinson | G06Q 10/08 |
| 2020/0094550 | A1* | 3/2020 | Miyagishi | B41J 2/0454 |
| 2020/0094561 | A1* | 3/2020 | Aoki | B41J 2/16532 |
| 2020/0174486 | A1* | 6/2020 | Luo | B60W 60/0011 |

* cited by examiner

*Primary Examiner* — Michael A Berns
(74) *Attorney, Agent, or Firm* — Womble Bond Dickinson (US) LLP

(57) ABSTRACT

In one embodiment, a computer-implemented method for calibrating autonomous driving vehicles at a cloud-based server includes receiving, at the cloud-based server, one or more vehicle calibration requests from at least one user, each vehicle calibration request including calibration data for one or more vehicles and processing in parallel, by the cloud-based server, the one or more vehicle calibration requests for the at least one user to generate a calibration result for each vehicle. The method further includes sending, by the cloud-based server, the calibration result for each vehicle to the at least one user.

18 Claims, 12 Drawing Sheets

| Speed | Accel./Decel. | Control Command |
|---|---|---|
| 10 mph | 2 mph/s | CMD 1 |
| 20 mph | 3 mph/s | CMD 2 |
| ... | ... | ... |
| Speed N | Accel. N | CMD N |

FIG. 7

CLOUD-BASED VEHICLE CALIBRATION SYSTEM FOR AUTONOMOUS DRIVING

TECHNICAL FIELD

Embodiments of the present disclosure relate generally to operating autonomous driving vehicles. More particularly, embodiments of the disclosure relate to calibrating a vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

In the design of an autonomous driving vehicle, a vehicle is first calibrated with regard to various vehicle-related parameters such as speed, acceleration, and control commands to achieve the desired acceleration. The vehicle calibration service typically includes two parts—data collection and training based on collected data. It is an ad-hoc process. In a traditional method, there are no standards on the quality and quantity of data. Furthermore, the calibration service is done for one vehicle at a time which results in a very low time efficiency.

BRIEF DESCRIPTION OF THE DRAWINGS

Embodiments of the disclosure are illustrated by way of example and not limitation in the figures of the accompanying drawings in which like references indicate similar elements.

FIG. 7 is a calibration table according to one embodiment.

DETAILED DESCRIPTION

Figure 1:
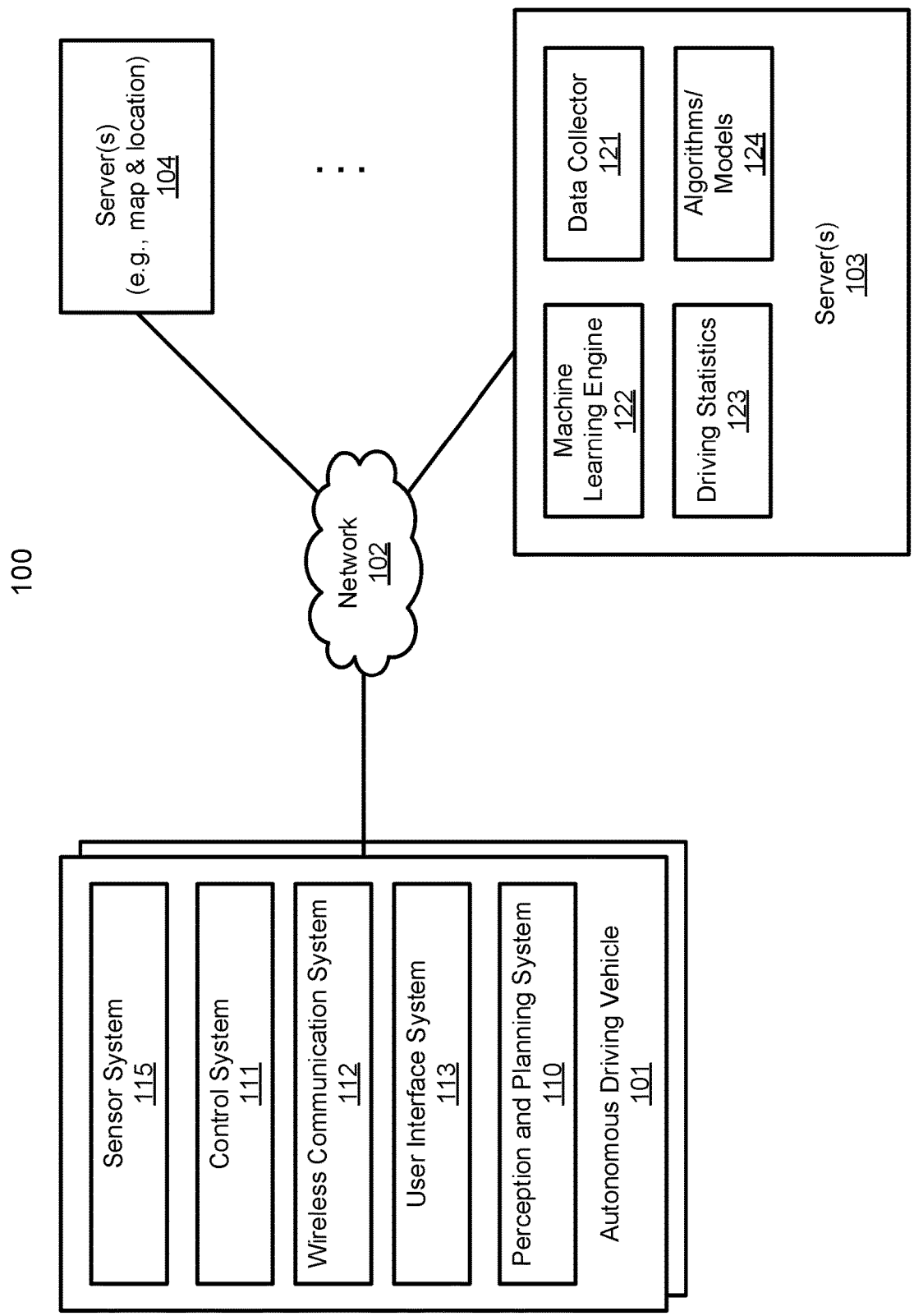
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a cloud server receives a vehicle calibration request from a client device over a network. The vehicle calibration request includes a set of calibration data collected from one or more vehicles and a first calibration category. The cloud server provides vehicle calibration services for one or more predetermined categories for a plurality of clients over the network. The cloud server performs a machine-learning operation to train a calibration model associated with the first calibration category based on the set of calibration data, where the first category is one of the plurality predetermined categories. The cloud server sends the calibration model to a destination device, where the calibration model is to be deployed to calibrate control commands of an autonomous driving system during autonomous driving of an autonomous driving vehicle.

In one embodiment, the set of calibration data was collected from the one or more vehicles while the vehicles were driving through various driving environments. The set of calibration data was received at the cloud server from the one or more vehicles automatically without use intervention over the network. The one or more vehicles are autonomous driving vehicles, and wherein the set of calibration data includes states of the vehicles and commands issued by an autonomous driving system of the vehicles at different points in time over a period of time. Each of the states of the vehicles is one of a speed, an acceleration, or a heading angle of the vehicles. The commands issued is one of a throttle command, a brake command, or a steering command. The predetermined categories comprise acceleration or deceleration, turning left or right, and changing lanes. The calibration model is configured to determine a command to be issued to a vehicle based on a current state and an expected state of the vehicle. The calibration model includes a calibration table having a plurality of mapping entries, each entry mapping a current state and an expected state of a vehicle to a control command to be issued to the vehicle in order for the vehicle to reach the expected state.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
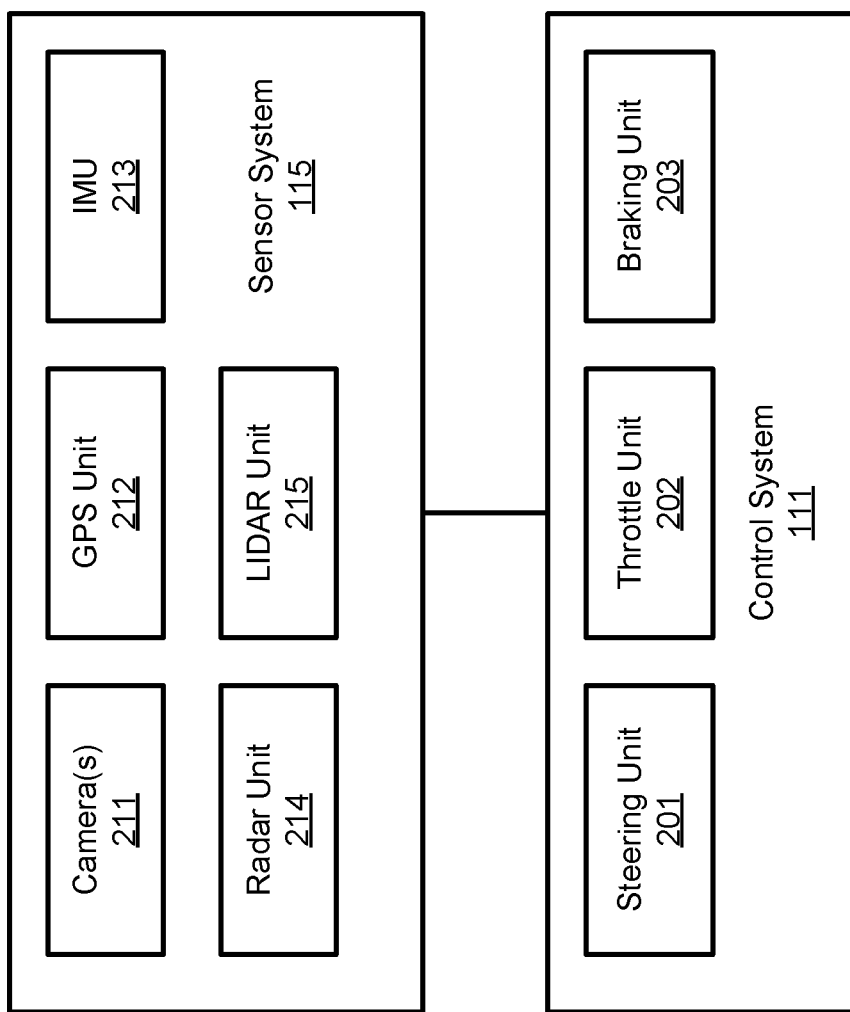
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include an algorithm for calibrating autonomous driving commands. Although there is only one ADV shown, more ADVs may be coupled to server 103. Each ADV can send a request and the calibration data to server 103 to request for a calibration model to trained. Algorithms 124 can then be uploaded on ADVs to be utilized during autonomous driving in real-time.

Figure 3A:
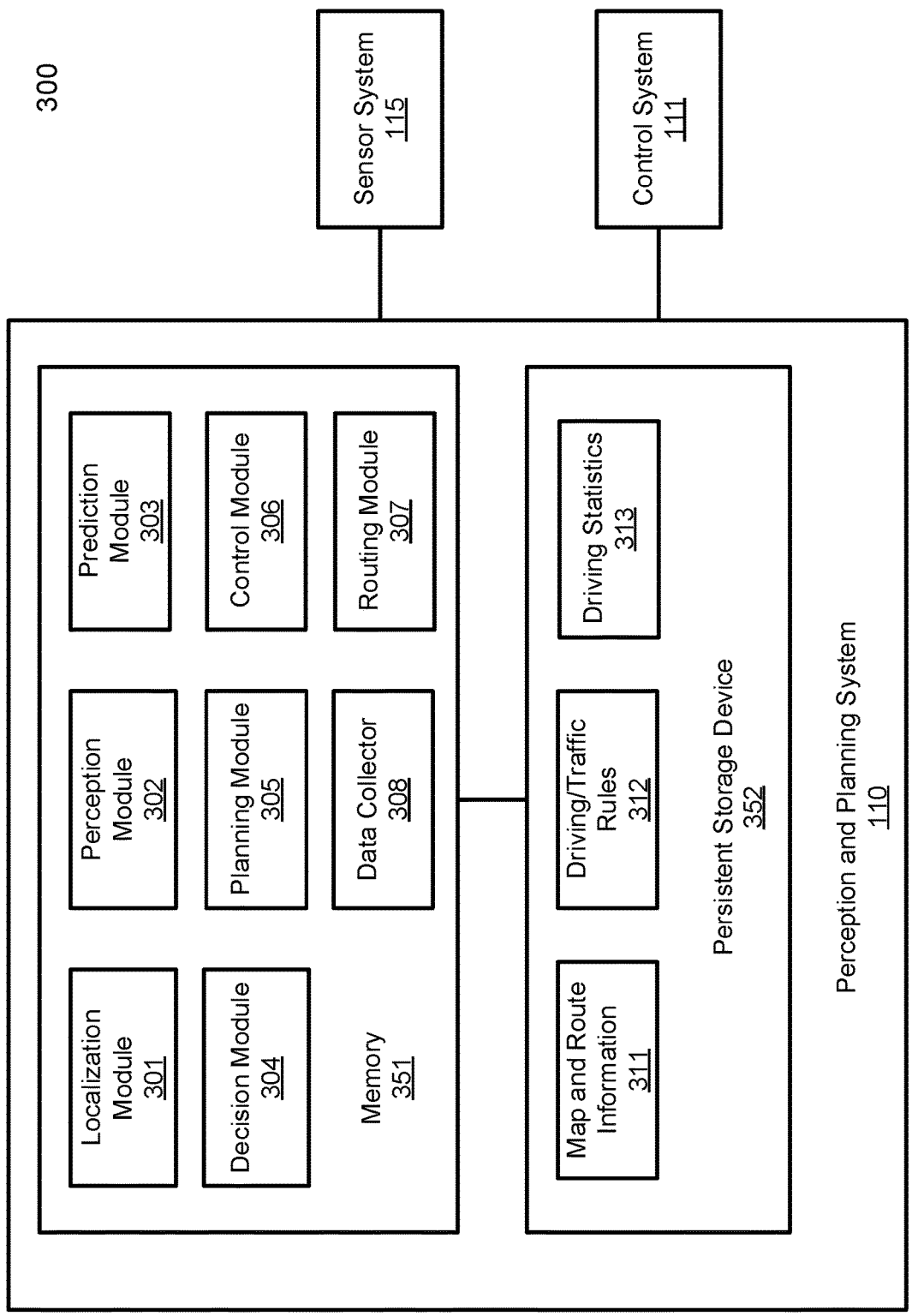
FIGS. 3A-3B are block diagrams illustrating an example of a perception and planning system used with an autonomous vehicle according to one embodiment.
Figure 3B:
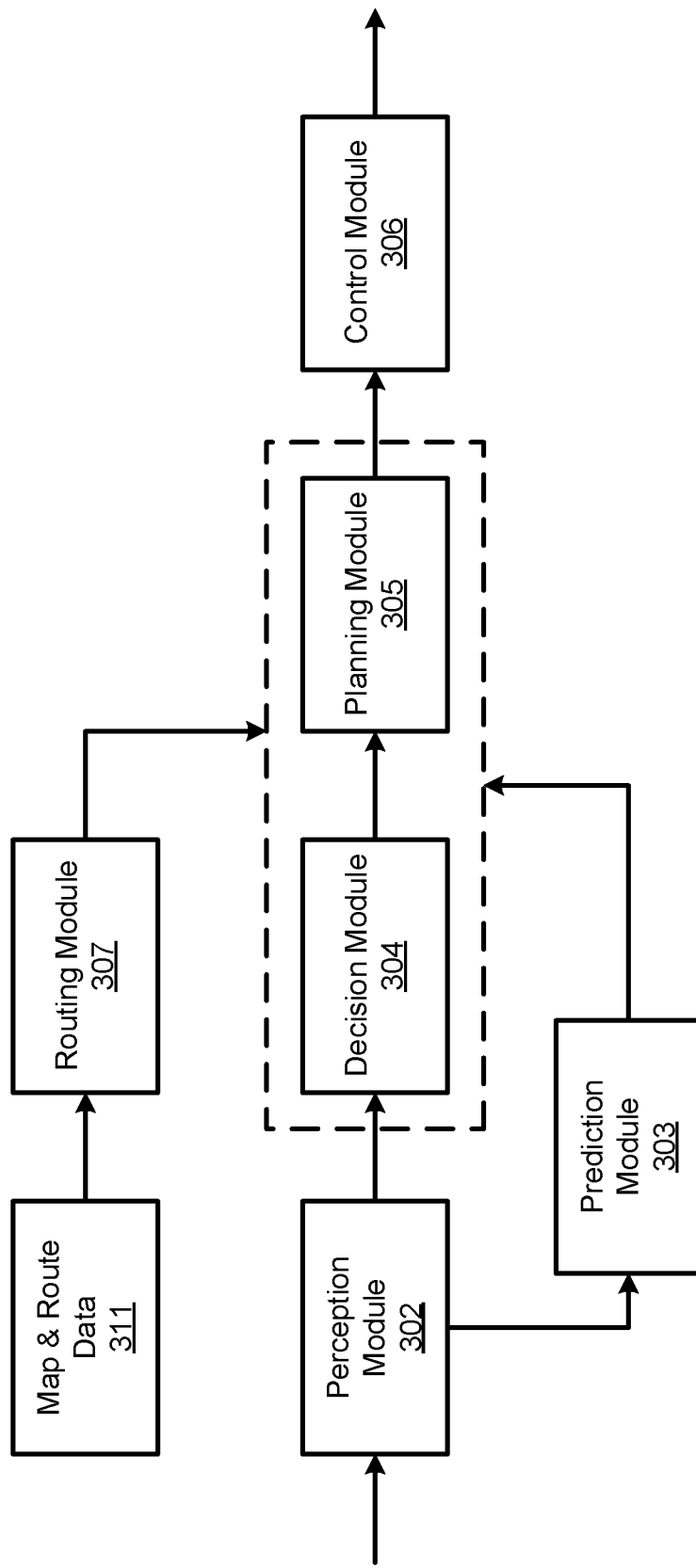

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, data collection module 308 is configured to collect driving statistics data from various components 301-307 and to store the data as part of driving statistics 313. The driving statistics 313 include vehicle states (e.g., speed, acceleration, heading direction) and control commands issued at different points in time. A user may specify what types or categories of data and an amount of data to collected via a user interface. Once the data has been collected, the collected data can be transmitted, either automatically or manually, to a cloud server (e.g., server 103) to request for a calibration. The cloud server performs an artificial intelligence (AI) training based on the driving statistics data to generate a calibration model or calibration table as an AI model. The calibration model or calibration table can then be deployed in an ADV to calibrate the control commands, for example, issued by control module 306 of the ADV. The calibration model or calibration table is utilized by the ADV to determine a proper control command (e.g., throttle/brake command or steering command) given a current state (e.g., current speed or current heading angle) and an expected state (e.g., expected acceleration or expected heading angle) of the vehicle.

Figure 4A:
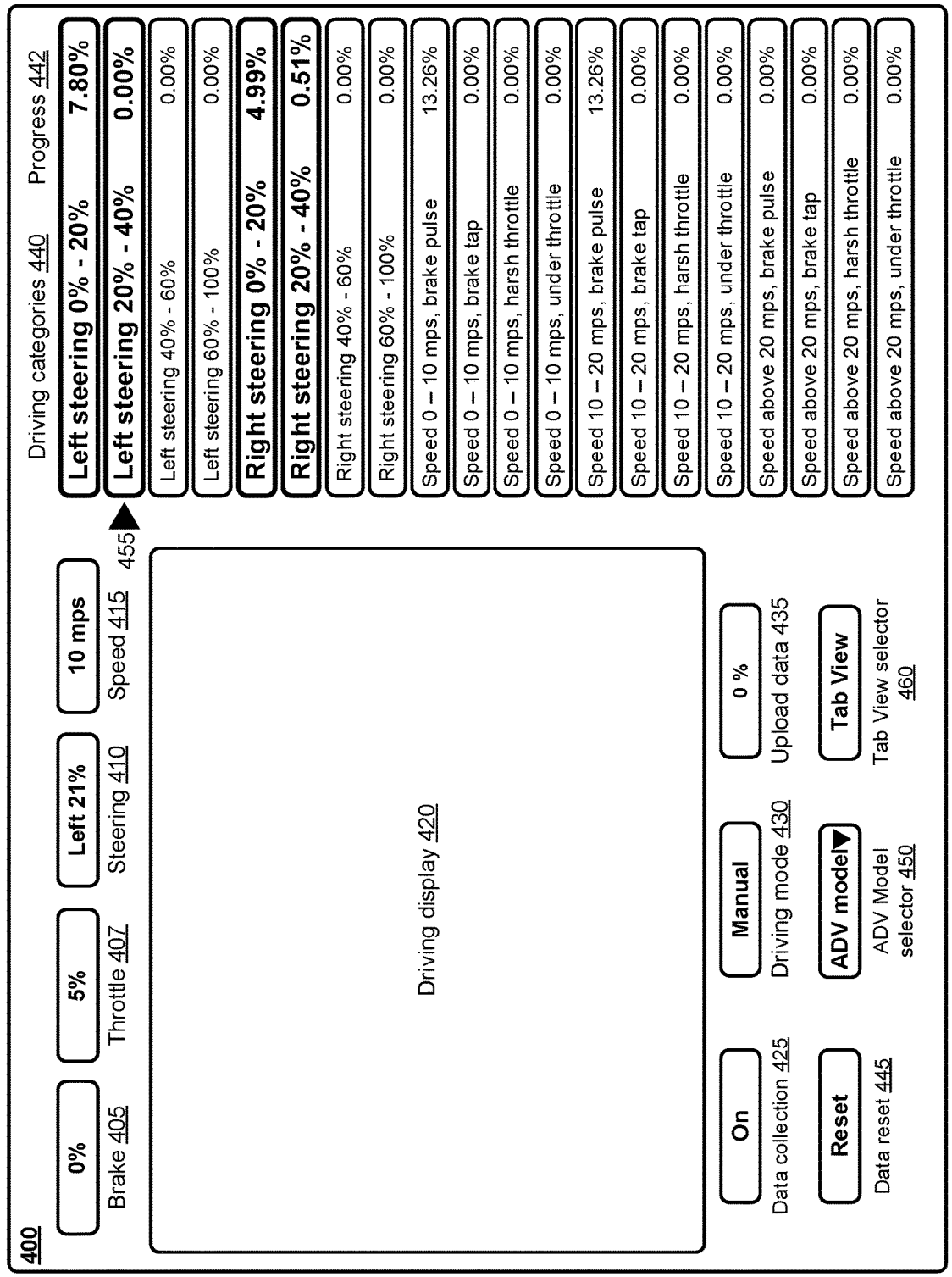
FIGS. 4A and 4B are block diagrams illustrating an example of a user interface for data collection from a vehicle according to one embodiment.

FIG. 4A is a block diagram illustrating a user interface 400 for a data collection automation system in an autonomous driving vehicle (ADV) according to an embodiment. The user interface as shown may be part of data collection module 308. As described above, goals of the claimed embodiments described herein include facilitating collection of human driving data in predefined driving categories, apprising the human driver of the progress of data collection in the predefined categories, to upload the collected data to a server for machine learning, and to receive a trained dynamic model for navigating the ADV in self-driving mode, in accordance with the trained model.

User interface (UI) 400 is displayed in the ADV for the human driver's use. UI 400 can include a brake input indicator 405, throttle input indicator 407, steering input indicator 410, and speed indicator 415. In human driving mode, control input indicators brake 405, throttle 407, and steering 410 represent the vehicle control inputs provided by a human driver. Brake input 405 can be expressed in a percentage (0 . . . 100%), e.g. less than 30% brake input, or a "brake pulse" which is, e.g., greater than 30%. In an embodiment, the threshold values for distinguishing between brake tap and brake pulse can be configured to be a different value than 30%. In an embodiment, additional braking categories can be configured, such as brake tap 0-20%, normal braking 20-30%, and harsh braking greater than 30% brake input. Steering input 410 can be expressed as a percentage of the total number of steering wheel revolutions to the left or right that the steering wheel is capable of being turned.

For example, if the steering wheel is capable of turning 1.5 full revolutions to the left or right, then turning the steering wheel 0.2 full revolutions would result in a percentage of 0.2*1.5=0.3 or 30% steering input. "Harsh throttle" may be expressed in terms of time and percentage, such as greater than 65% throttle input for 2 to 3 seconds duration or longer, such as when a human driver is preparing to pass a vehicle or enter a freeway. Similarly, "under throttle" can be expressed as a percentage and time such as 0-5% throttle input for 2-3 seconds, such as a human driver may do when "coasting." In an embodiment, throttle input for driving categories can have additional ranges, such as throttle 0-20% slow acceleration, 20-50% normal acceleration, and greater than 50% is harsh acceleration. The above values are exemplary only. Definitions for each driving input type for each driving category 440 can be defined by a test engineer or by a server such as server 103. In an embodiment, the UI 400 can be configured to display on the driving categories for which instructions have been received to collect driving data.

UI 400 can further include a plurality of driving categories 440 each having a progress indicator 442. Exemplary driving categories are shown under the driving categories 440 heading in FIG. 4A. A human driver, or the ADV, can receive instructions to collect data for one or more of the driving categories 440. The ADV can receive the instructions from a server that will later receive the data collected. Alternatively, a human driver can receive written instructions as to which driving categories 440 to collect data upon, and how much data to collect for each category. A user can touch a driving category on the UI 400, e.g. "left steering 0%-20%" and enter a quantity of data to collect, e.g. a duration of time or a number of data frames to collect. In an embodiment, an email system within the ADV 101 can receive an email of instructions on driving data to collect, the human driver can open the email, select an activation control from the email, and the UI 400 will update to highlight the specific driving categories 440 to collect data for, and a current progress on the collection of driving data for the highlighted categories.

Progress of data collected 442 for a driving category 440 can either represent the progress of data collected by this particular ADV 101, or represent progress on a total amount of data needed to be collected by a plurality of ADVs 101. In the latter embodiment, the plurality of ADVs all contribute to the progress on collecting data for a driving category 440 and the progress indicator 442 indicates the collective progress for the plurality of ADVs. The server 103 can estimate an amount of data needed to achieve a threshold grading value for a dynamic model for use in a self-driving ADV. As the server receives data from any of the plurality of ADVs for a driving category, the server can push an update message to the plurality of ADVs indicating a current progress of data collection for the driving category, for the plurality of ADVs.

In an embodiment, UI 400 can highlight the driving categories for which data is to be collected, e.g. by visually grouping the driving categories together for which data is to be collected (not shown in FIG. 4), or by visually highlighting the driving categories for which data is to be collected. As shown in FIG. 4, four categories are bolded to show that they are the driving categories 440 for which instructions have been received to collect human driving data: Left steering 0%-20%, Left steering 20%-40%, Right steering 0%-20%, and Right steering 20%-40%.

As the ADV is being driving by the human driver, an indication can be provided that lets the driver know which driving category 440 matches the current state of the ADV. In an embodiment, indicator 455 provides a visual indication of a current driving category that the human driver is driving the ADV 101 in accordance with a particular driving category 440, in this case, "left steering 20%-40%." In an embodiment, the indication 455 can also, or alternatively, include an audio indication of the current driving category 455. In an embodiment, when the progress of data collection for a driving category 440 reaches 100%, the visual highlighting of driving category 440 may be removed so that only the driving categories 440 for which data is still to be collected (progress less than 100%) remain highlighted. In an embodiment, progress indicator 442 may in addition, or alternatively, include a visual progress bar overlaid onto the driving category 440 for which data is being collected. In an embodiment, progress indicator 442 may further include an audio message indicating progress of data collection for a driving category 440. In an embodiment, the human driver can choose the driving categories to decide where to perform the driving data collection task, such as normal driving, empty parking lot, speedway, or test track.

UI 400 can further include a data collection control 425 to turn on/off data collection for the driving categories 440 for which the human driver is to collect data. UI 400 can further include a driving mode control 430 that selects manual ("human driver") mode or self-driving (autonomous driving) mode for the ADV 101. UI 400 can also include a control to upload data 435. When selected, upload data 435 uploads the data collected for the driving categories 440 for which the ADV 101 was instructed to collect data. Upload data control 435 can include a progress indicator to let the human driver know the progress of data uploading to server 103. UI 400 can also include a reset control 445 that can reset progress indicators 442 for all driving categories 440. In an embodiment, selecting the reset control 445 can also flush persistent storage 352 storage frames of driving data 313.

The present disclosure accounts for the fact that different models or configurations of vehicles have different physical attributes, such as weight, wheel base, turning radius, braking configuration, engine horsepower, acceleration, top speed, etc. UI 400 can include an ADV model selector 450 that includes a drop down list (indicated by the down arrow "▼" in control 450 of FIG. 4) that allows the user to select the particular model of ADV for which driving data is collected. In an embodiment, the ADV model 450 defaults to the specific model of ADV 101 in which the UI 400 is installed and in-use. Selecting a specific model can automatically update the UI 400 to indicate driving categories 440 that are defined for the specific model of ADV 101, which can differ from other models of ADV 101.

UI 400 can also include a general display area 420 that can display any relevant information to the human driver. In self-driving mode, the display 420 would be used to indicate a planned trajectory of the ADV 101, obstacles along the driving path of the ADV 101, and the like. In human driving mode, this information may be considered a distraction to the human driver and may be omitted.

Figure 4B:
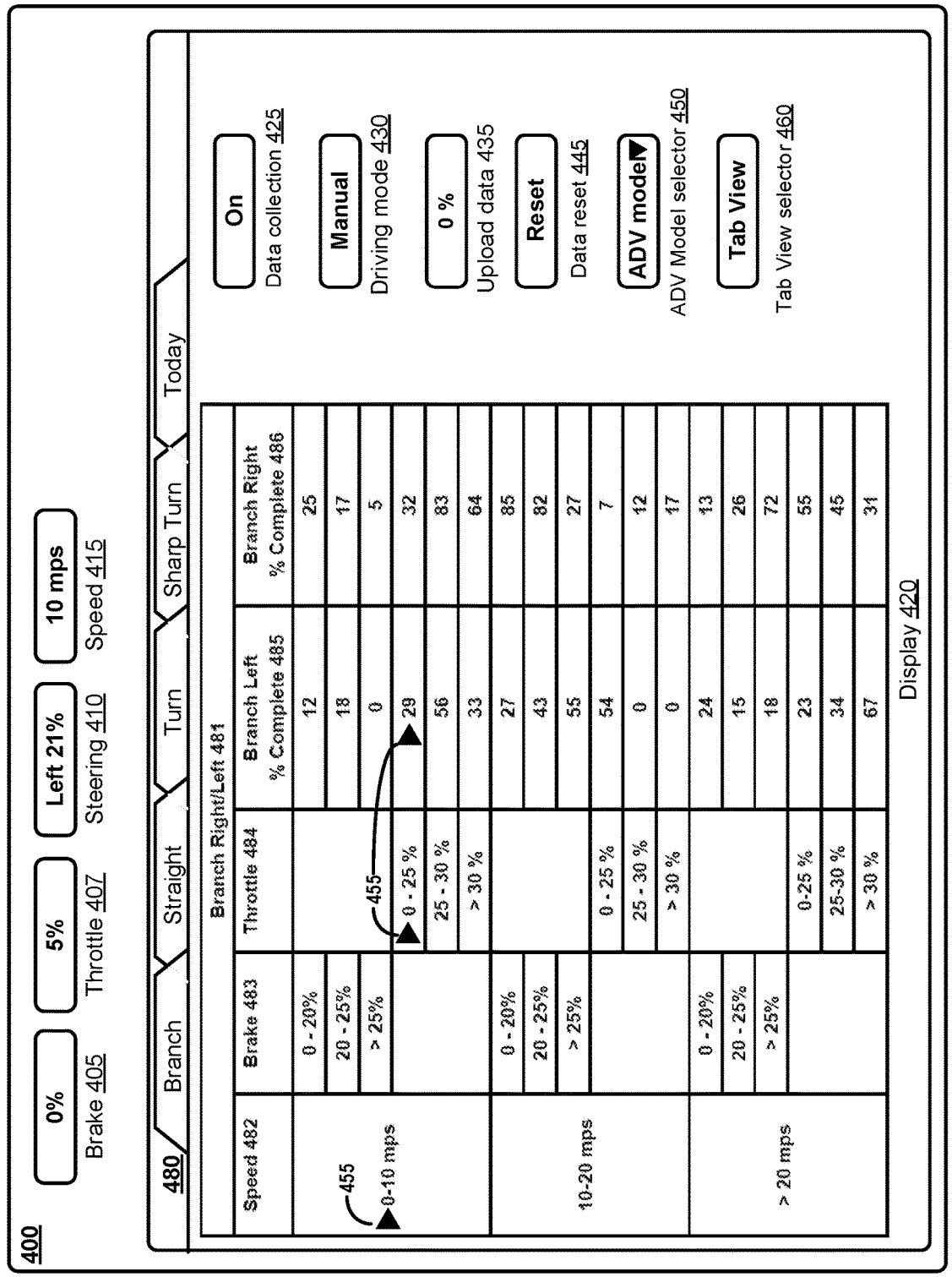

FIG. 4B is a block diagram illustrating a user interface 400 for a data collection automation system in an autonomous driving vehicle (ADV) according to an embodiment. In this user interface 400, a user has selected "Tab View" using tab view selector 460. In tab view, driving display is filled with a tabbed selection 480 of different combinations of driving categories 440 to choose from. Tabs may include driving categories for branch turn (e.g.) 20°-75°, straight driving (no turn), a turn (e.g. 75°-90° turn), sharp turn (e.g. 180° U-turn, or similar sharp turn). Tabs 480 may further include a tab labeled "Today," indicating driving categories for which driving data collection instructions have been received. The Today tab can include driving categories 440 shown in FIG. 4A, or as shown tabbed view driving categories, e.g. branch, straight, turn, sharp turn, at certain speed range and brake or throttle input.

In the tabbed view shown in FIG. 4B, the branch 481 tab has been selected. Selection of a tab can be made by touching the desired tab on the display 420, voice command (e.g. "branch tab"), or other selection method. Branch tab 481 displays driving categories and progress indicators for each driving category. Each driving category may have a speed range 482, e.g. 0-10 mps, 10-20 mps, or greater than (">") 20 mps. For each speed range 482, the driving category can have either a brake 483 input range or a throttle 484 input range. Brake 483 input ranges can be, e.g., 0-20%, 20-25%, or greater than 25%. Throttle 484 input ranges can be, e.g. 0-25%, 25-30%, or greater than 30%. The range values shown are exemplary, and non-limiting. Speed 482 ranges, brake 483 input ranges, and throttle 484 input ranges can be specified and edited, added to, or deleted. For each speed range 482, and brake 483 input or throttle 484 input, there can be a driving category with progress indicator for "branch left" 485 or "branch right" 486. A branch is a turn that is, e.g. 20°-75° turning from straight ahead driving. A progress indicator can be displayed under the heading "branch left % complete 485" or "branch right % complete 486." A numeric percentage of completion of an amount of driving data to collect for the driving category is shown in FIG. 4B. Percentage completion can be shown by other indicator such as a progress bar, audio indication, or other manner of indicating progress on the data collection for the driving category.

To facilitate easy viewing for the human driver, a current driving category in which the driver is driving the vehicle can be indicated by, e.g., highlighting the speed range in which the human driver is currently driving the ADV, highlighting the applicable brake 483 or throttle 484 input range that the vehicle is being operated, or by means of a visual cue, such as arrow 455, as shown in FIG. 4. In an embodiment, as the human driver navigate the ADV, and speed 482, and brake 483 or throttle 484 inputs, and branch left 485 or right 486 progress indicator visual highlights or cues can automatically update to reflect a current state of operation of the ADV.

In the tabbed view of FIG. 4B, the same controls as shown in FIG. 4A may be located into a different part of the UI 400. For example, controls for data collection on/off 425, driving mode 430, update data 435, data reset 455, ADV model selector 450, and Tab view selector 460 can be shown arranged in a vertical column at the right of the tabbed view area of display 420.

The Straight tab can have a display layout (not shown) similar to the Branch tab 481, with a column for speed range 482, brake input range 483, and throttle input range 484. A column 485 may be shown for straight driving data collection progress within one of the driving categories, e.g. 0-10 mps with throttle input of 0-25%. A straight driving category can represent substantially straight-ahead driving within, e.g. 0 . . . ±20° turning from straight ahead.

The Turn tab can have a display layout (not shown) similar to the Branch tab, with a column for speed range 482, brake input range 483, and throttle input range 484. A column 485 may be shown for left turn driving data collection progress within one of the driving categories, e.g. a speed range 482 of 0-10 mps with throttle input 484 of 0-25%. A column 486 may be shown for right turn driving data collection progress within of the driving categories of speed range, and brake 483 or throttle 484 input range. Turn driving can represent a turn within, e.g. 20°-90° from straight ahead, either left 485 or right 486.

The Sharp Turn tab can have a display layout (not shown) similar to the Branch tab, with a column for speed range 482, brake input range 483, and throttle input range 484. A column 485 may be shown for sharp left turn driving data collection progress 485 within each of the driving categories, e.g. speed range 482 of 0-10 mps with throttle 484 input of 0-25%. A column 486 may be shown for sharp right turn driving data collection progress within each of the driving categories of speed range 482, and brake 483 or throttle 484 input range. Turn driving can represent a turn within, e.g. 20°-90° from straight ahead, either left 485 or right 486.

Figure 5:
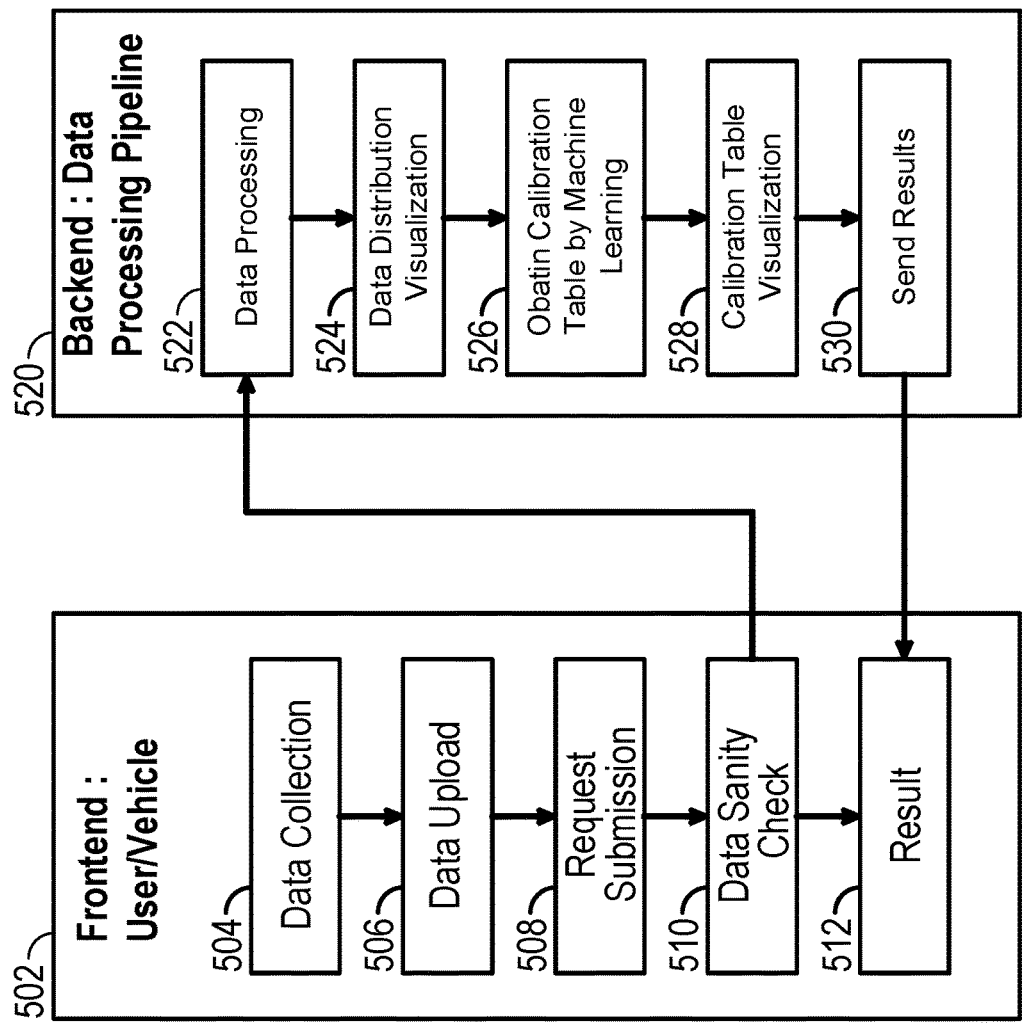
FIG. 5 shows the interaction between a user's request for vehicle calibration with a cloud-based server according to one embodiment.

FIG. 5 shows the interaction between a user's request for vehicle calibration with a cloud-based server according to one embodiment. A frontend user system 502 obtains data collection at 504 from one or more users, each user having at least one job, each job including one or more vehicles to be calibrated. In the description that follows, one user, one job, and one vehicle are used as an example for simplicity of explanation. In an alternative embodiment, multiple users with each user initiating multiple jobs having multiple vehicles, may access a cloud-based server for parallel vehicle calibration processing. The data collection may include suitable vehicle data such as speed, acceleration, and deceleration of the vehicle. Such vehicle data may be obtained or collected by a suitable data collection monitor/system while a vehicle is being driven by a driver on a road or the driver may remotely control the vehicle using a remote controller.

The data collection monitor, such as data collector 308, obtains various operating parameters of the vehicle in suitable ranges. For example, the speed of the vehicle may be classified as low, medium, high and the acceleration (throttle) and deceleration (braking) may also be classified as low, medium, and high. Using the data collection monitor, a user or driver may collect the vehicle data and monitor its progress by monitoring the filling in of a progressive bar on the computer screen indicating a progress of data collection. Once the progressive bar is filled to a certain threshold, this signifies that sufficient data has been collected. After the data collection is finished, the vehicle data is uploaded at block 506 to a suitable cloud-based server for storage. The user at block 508 then submits a request for vehicle calibration service to be performed by a cloud-based server which may or may not be the same cloud-based server used for the data upload at block 504. A data sanity check is performed at 510 which includes checking that all of the vehicle data that is needed for calibration exists and that the vehicle data is in a proper format. If the data sanity check passes, then the calibration data is processed at block 522 by the backend (data pipeline) cloud-based server block 520.

Figure 6:
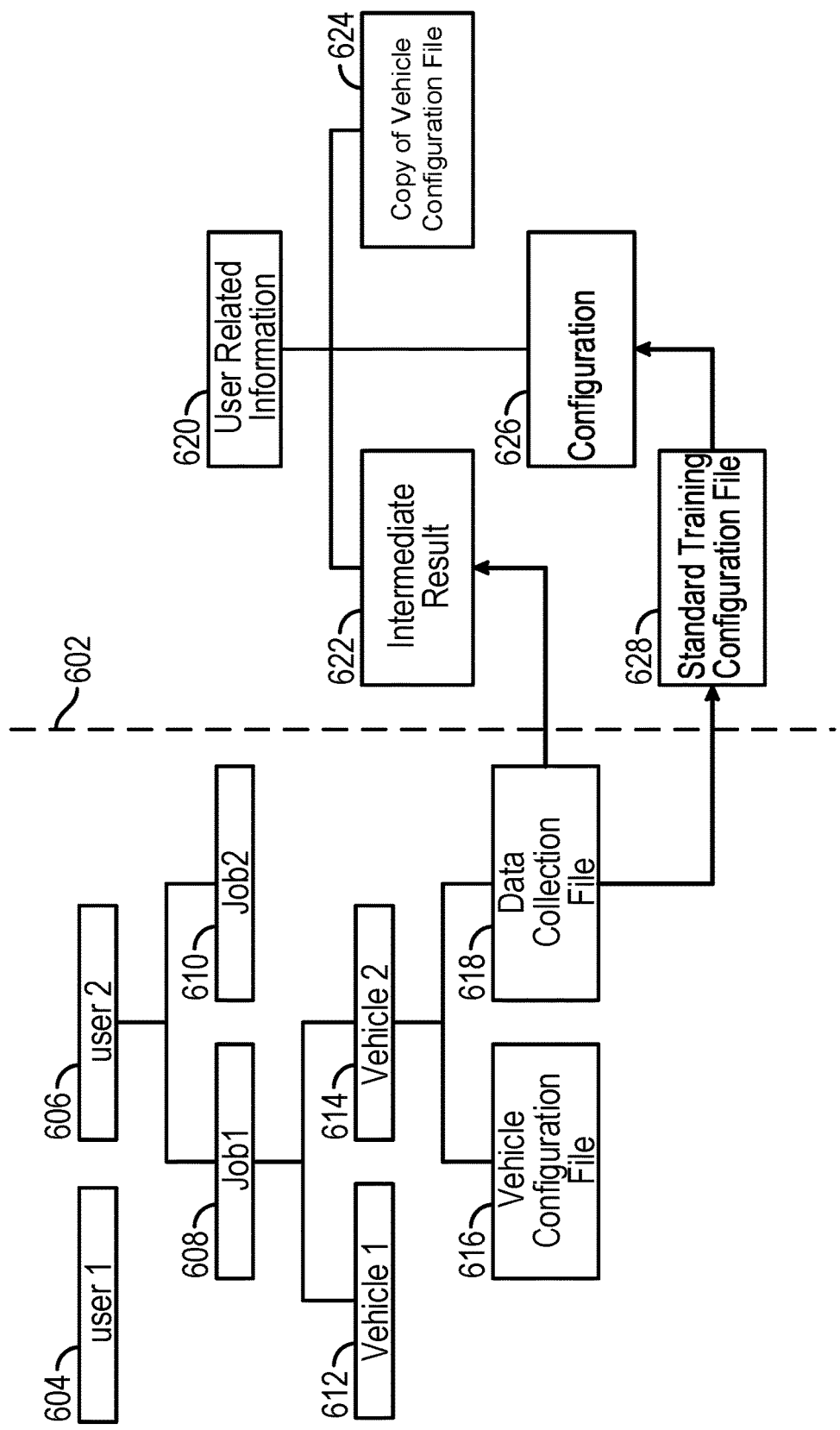
FIG. 6 shows multiple users accessing in parallel a cloud-based server according to one embodiment.

Continuing with FIG. 5, at block 522, the calibration data for a vehicle is extracted from a record or file (see e.g., FIG. 6, data collection record or file 618). At block 524, cloud-based server 520 performs a data distribution visualization operation and generates a visual representation of the received calibration data. The visual representation may include one or histograms to be described with reference to FIGS. 8A-8C, below. At block 526, cloud-based server 520 obtains a calibration table based on the calibration data via a suitable machine learning algorithm such as a multi-layer perception (MLP) algorithm. At block 528, cloud-based server performs a calibration table visualization operation to generate a visual representation of the calibration table. An example of a visual representation of a calibration table will be described with reference to FIG. 7 below. At block 530, the calibration results including a visual representation of a calibration table are emailed to the user who receives it at block 512. The processes depicted in frontend user system 502 and backend cloud-based server 520 may be performed by processing logic which may include software, hardware, or a combination thereof. For example, each process may be implemented using a suitable processor and memory for storing instructions to implement the process.

FIG. 6 shows an example of multiple users accessing in parallel a cloud-based server for vehicle calibration according to one embodiment. The left side of a dashed line 602 represents a portion of a frontend user system and the right side of dashed line 602 represents a portion of a cloud-based server for vehicle calibration. On the left side of dashed line 602, multiple users such as user 1 (604) and user 2 (606) are shown. In the example of user 2 (606), user 2 has multiple jobs such as job 1 (608) and job 2 (610) in which job 1 (608) includes multiple vehicles such as vehicle 1 (612) and vehicle 2 (614). In the example of vehicle 2 (614), the frontend user system includes a vehicle configuration file 616 and a data collection file or record 618. Vehicle configuration file 616 is a vehicle parameter file which includes vehicle parameters such as whether the vehicle is a truck or a car and the physical dimensions of each vehicle. Data collection file 618 stores the data collection results from data collection 504 shown in FIG. 5. For example, data collection file 618 may contain data collected by data collector 308 based on user inputs obtained via user interfaces as shown in FIGS. 4A and 4B.

Continuing with FIG. 6, the right side of dashed line 602 shows in more detail some of the processing (e.g., data processing 522 shown in FIG. 5) which occurs at the backend cloud-based server 520 shown in FIG. 5. User related information folder 620 is created by the cloud-based server. For example, user related information folder 620 may include a user identification (ID), a job ID, and a vehicle ID. A copy of the vehicle configuration file (e.g., vehicle configuration file 616) is stored on the cloud-based server for faster access to the data in vehicle configuration file 616 by the cloud-based server. Intermediate results 622 based on the data in data collection file 618 are stored in a folder in the cloud-based server in a suitable file format such as an HDF (hierarchical data format) file and the intermediate results include data needed for training by a machine learning algorithm described above. A standard training configuration file 628 includes default values such as default values for maximum/minimum speed, maximum/minimum acceleration and maximum brake/throttle of a vehicle. For example, the default values for maximum/minimum speed may be 0-100 mph. However, if the user's vehicle speed data (e.g., data in data collection file 618 for vehicle 2) is from 0-5 mph, then the default values 0-100 mph are changed to 0-5 mph. In this way, the default values are changed to the actual collected vehicle data and stored in a customized training configuration file 626 for this specific job (e.g., job 1) and vehicle (e.g., vehicle 2). The customized training configuration file 626 is then used for training parameters by the machine learning algorithm described above to generate results. After the training model is completed, the machine learning algorithm outputs a calibration table (e.g., a particular form of a calibration model), which is then sent by the cloud-based server to the user by email. In one embodiment, the calibration table may be sent to the user in the form of a visual representation for ease of understanding by the user.

Thus, the cloud server provides a set of standard application programming interfaces (APIs) to allow various clients (e.g., users, vehicles) to submit a request for calibration of control commands for controlling vehicles. Since the cloud server is configured to centrally process and generate calibration models or tables, the quality and efficiency of the calibration services can be maintained.

FIG. 7 is a visual representation of a calibration table 700 according to one embodiment. Calibration table 700 represents a calibration model generated by a cloud server based on driving data collected from various vehicles as described above. Calibration table 700 includes a speed column 702, an acceleration/deceleration column 704, and a control command column 706. Various example values are shown in each column. Such a calibration table is used to design a longitudinal controller for an ADV. The longitudinal controller is used to control an output represented by a control command such that an ADV traveling at a certain speed can accelerate or decelerate to a target speed via a suitable throttle or braking command.

Calibration table 700 may be deployed in an ADV and utilized by a control module such as control module 306. In this example, calibration table 700 includes a number of mapping entries. Each entry maps a particular speed 702 and a particular acceleration or deceleration 704 to a control command 706 such as a throttle or brake command. The mapping entries are created as a part of machine-learning training by the cloud server based on a large amount of data collected from many vehicles driving under different driving scenarios. During the real-time autonomous driving, when a planning module instructs a control module to control the vehicle to achieve a calculated acceleration given the current speed of the vehicle, the control module can perform a lookup operation in the calibration table 700 based on the current speed of the vehicle and the expected acceleration to find an entry matching the fields 702 and 704. From the matching entry, the corresponding commend 706 can be obtained and issued to the vehicle.

Figure 8A:
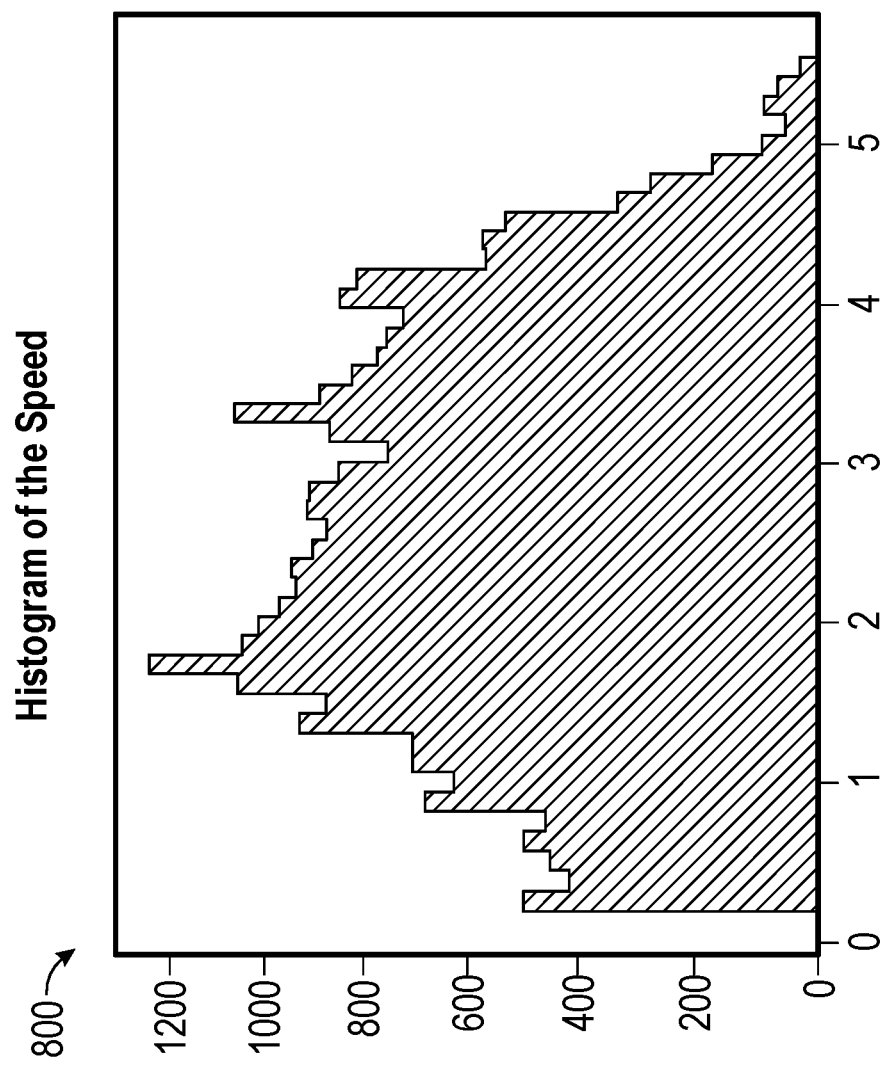
FIGS. 8A-8C are histograms of speed, acceleration, and control command, respectively, according to one embodiment.
Figure 8B:
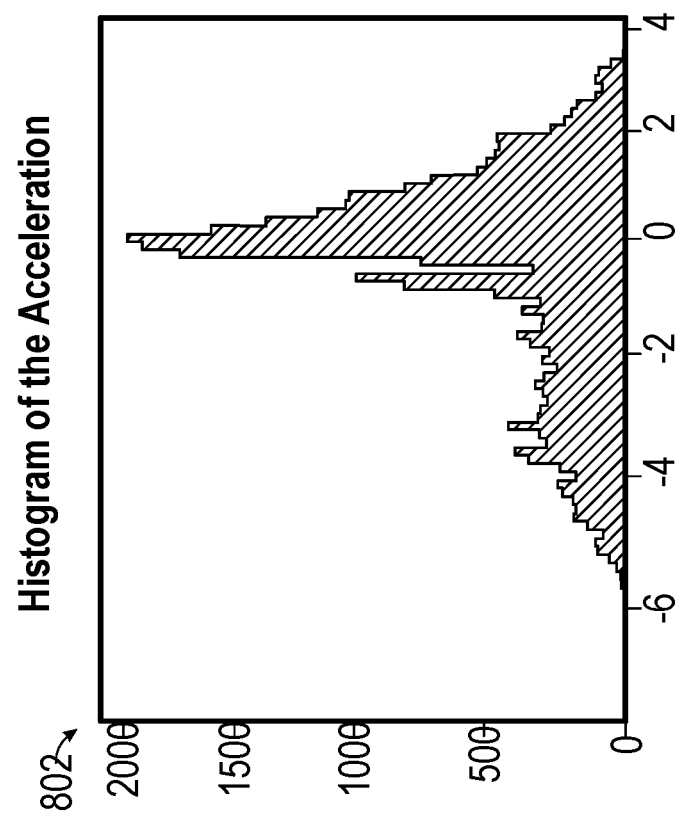
Figure 8C:
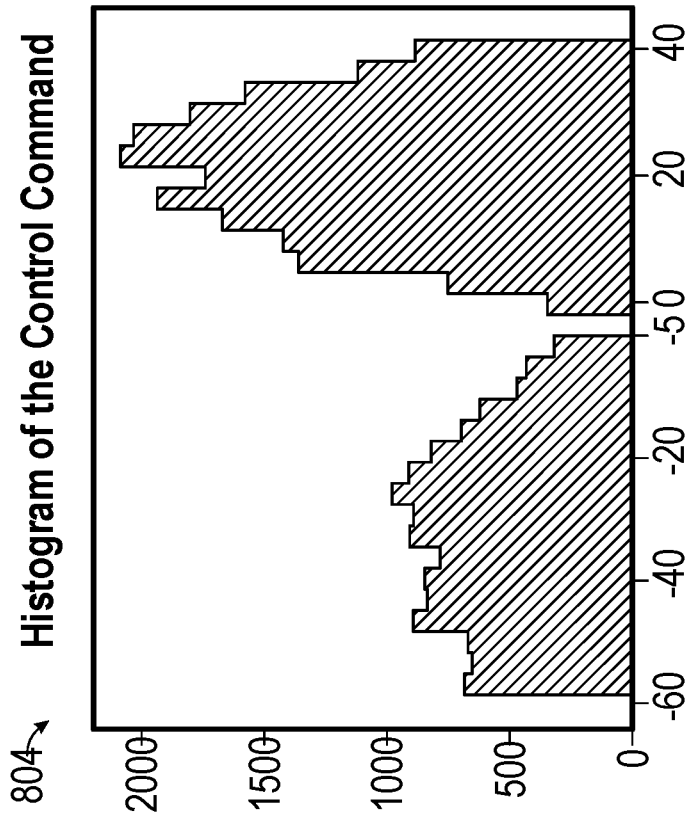

FIGS. 8A-8C are histograms of speed 800, acceleration 802, and control command 804, respectively, according to one embodiment. In FIG. 8A, the x-axis represents speed and the y-axis represents the number of data points for the data collected for a specific vehicle to be calibrated. In FIG. 8B, the x-axis represents acceleration for positive values and deceleration for negative values and the y-axis represents the number of data points for the data collected for the specific vehicle to be calibrated. In FIG. 8C, the x-axis represents throttle command for positive values and braking command for negative values and the y-axis represents the number of data points for the data collected for the specific vehicle to be calibrated. In the example shown in FIG. 8C, a "dead zone" exists between −5 and about 0 on the x-axis due to the absence of data collection in that range.

Figure 9:
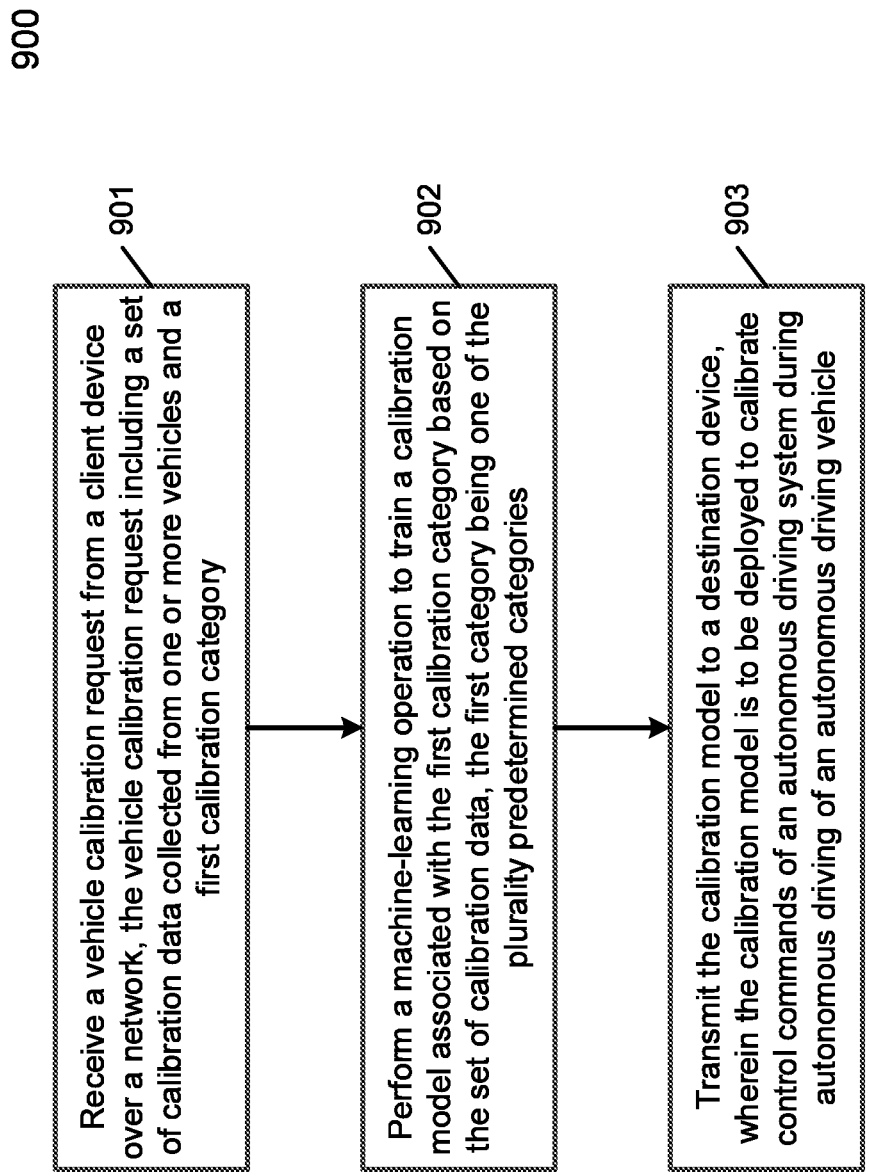
FIG. 9 is a flow diagram illustrating a process of training and generating a calibration model according to one embodiment.

FIG. 9 is a flow diagram illustrating a process of generating a calibration model according to one embodiment. Process 900 may be performed by processing logic which may include software, hardware, or a combination thereof. For example, process 900 may be performed by server 103. Referring to FIG. 9, at block 901, processing logic receives a vehicle calibration request from a client device (e.g., user system, autonomous driving vehicle) over a network. The request includes a set of calibration data collected from one or more vehicles and a first calibration category. At block 902, processing logic performs a machine-learning operation to train a calibration model associated with the first calibration category based on the set of calibration data. The first calibration category is one of a number of predetermined calibration categories. At block 903, the calibration model (e.g., calibration table) is transmitted to a destination. The calibration model can then be deployed in an autonomous driving vehicle during autonomous driving.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for calibrating an autonomous driving system for autonomous driving vehicles, the method comprising:
    receiving, at a cloud server, a vehicle calibration request from a client device over a network, the vehicle calibration request including a set of calibration data collected from one or more vehicles and a first calibration category, wherein the cloud server provides vehicle calibration services for one or more predetermined categories for a plurality of clients over the network, the first calibration category being one of the one or more predetermined categories comprising acceleration or deceleration, turning left or right, or changing lanes;
    performing, at the cloud server, a machine-learning operation to train a calibration model associated with the first calibration category based on the set of calibration data; and
    sending, by the cloud server, the calibration model to a destination device, wherein the calibration model is to be deployed to calibrate control commands of an autonomous driving system for the one of the one or more plurality predetermined driving categories comprising acceleration or deceleration, turning left or right, or changing lanes during autonomous driving of an autonomous driving vehicle.

2. The method of claim 1, wherein the set of calibration data was collected from the one or more vehicles while the one or more vehicles were driving through various driving environments.

3. The method of claim 2, wherein the set of calibration data was received at the cloud server from the one or more vehicles automatically without use intervention over the network.

4. The method of claim 2, wherein the one or more vehicles are autonomous driving vehicles, and wherein the set of calibration data includes states of the one or more vehicles and commands issued by an autonomous driving system of the one or more vehicles at different points in time over a period of time.

5. The method of claim 4, wherein each of the states of the vehicles is one of a speed, an acceleration, or a heading angle of the vehicles.

6. The method of claim 4, wherein each of the commands issued is one of a throttle command, a brake command, or a steering command.

7. The method of claim 1, wherein the calibration model is configured to determine a command to be issued to a vehicle based on a current state and an expected state of the vehicle.

8. The method of claim 1, wherein the calibration model includes a calibration table having a plurality of mapping entries, each entry mapping a current state and an expected state of a vehicle to a control command to be issued to the vehicle in order for the vehicle to reach the expected state.

9. A non-transitory machine-readable medium having instructions stored therein, which when executed by a processor, cause the processor to perform a method for calibrating an autonomous driving system for autonomous driving vehicles, the method comprising:
    receiving, at a cloud server, a vehicle calibration request from a client device over a network, the vehicle calibration request including a set of calibration data collected from one or more vehicles and a first calibration category, wherein the cloud server provides vehicle calibration services for one or more predetermined categories for a plurality of clients over the network, the first calibration category being one of the one or more predetermined categories comprising acceleration or deceleration, turning left or right, or changing lanes;
    performing, at the cloud server, a machine-learning operation to train a calibration model associated with the first calibration category based on the set of calibration data; and sending, by the cloud server, the calibration model to a destination device, wherein the calibration model is to be deployed to calibrate control commands of an autonomous driving system for the one of the one or more plurality predetermined driving categories comprising acceleration or deceleration, turning left or right, or changing lanes during autonomous driving of an autonomous driving vehicle.

10. The machine-readable medium of claim 9, wherein the set of calibration data was collected from the one or more vehicles while the one or more vehicles were driving through various driving environments.

11. The machine-readable medium of claim 10, wherein the set of calibration data was received at the cloud server from the one or more vehicles automatically without use intervention over the network.

12. The machine-readable medium of claim 10, wherein the one or more vehicles are autonomous driving vehicles, and wherein the set of calibration data includes states of the one or more vehicles and commands issued by an autonomous driving system of the vehicles at different points in time over a period of time.

13. The machine-readable medium of claim 12, wherein each of the states of the one or more vehicles is one of a speed, an acceleration, or a heading angle of the vehicles.

14. The machine-readable medium of claim 12, wherein each of the commands issued is one of a throttle command, a brake command, or a steering command.

15. The machine-readable medium of claim 9, wherein the calibration model is configured to determine a command to be issued to a vehicle based on a current state and an expected state of the vehicle.

16. The machine-readable medium of claim 9, wherein the calibration model includes a calibration table having a plurality of mapping entries, each entry mapping a current state and an expected state of a vehicle to a control command to be issued to the vehicle in order for the vehicle to reach the expected state.

17. A cloud server, comprising:
a processor; and
a memory coupled to the processor to store instructions, which when executed by the processor, cause the processor to perform a method for calibrating an autonomous driving system for autonomous driving vehicles, the method comprising
receiving a vehicle calibration request from a client device over a network, the vehicle calibration request including a set of calibration data collected from one or more vehicles and a first calibration category, wherein the cloud server provides vehicle calibration services for one or more predetermined categories for a plurality of clients over the network, the first calibration category being one of the one or more predetermined categories comprising acceleration or deceleration, turning left or right, or changing lanes;
performing a machine-learning operation to train a calibration model associated with the first calibration category based on the set of calibration data; and
sending the calibration model to a destination device, wherein the calibration model is to be deployed to calibrate control commands of an autonomous driving system for the one of the one or more plurality predetermined driving categories comprising acceleration or deceleration, turning left or right, or changing lanes during autonomous driving of an autonomous driving vehicle.

18. The system of claim 17, wherein the set of calibration data was collected from the one or more vehicles while the one or more vehicles were driving through various driving environments.

* * * * *